(12) United States Patent
Riener

(10) Patent No.: US 7,511,924 B1
(45) Date of Patent: Mar. 31, 2009

(54) CONDUCTOR ASSEMBLY FOR REDUCING TRACK MISREGISTRATION IN A DISK DRIVE

(75) Inventor: Timothy A. Riener, Fremont, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/351,128

(22) Filed: Feb. 9, 2006

Related U.S. Application Data

(62) Division of application No. 09/877,507, filed on Jun. 8, 2001, now Pat. No. 7,023,665.

(51) Int. Cl.
*G11B 5/48* (2006.01)
(52) U.S. Cl. .................................. 360/245.9
(58) Field of Classification Search .............. 360/245.8, 360/245.9, 264.2, 265.7, 265.9, 266
See application file for complete search history.

(56) References Cited

U.S. PATENT DOCUMENTS 5,610,785 A * 3/1997 Aoyagi et al. ............ 360/245.8
5,677,815 A * 10/1997 Chan ........................ 360/265.7

* cited by examiner

*Primary Examiner*—Angel A. Castro
(74) *Attorney, Agent, or Firm*—Fellers, Snider, et al.

(57) ABSTRACT

A conductor assembly for carrying electrical signals is provided for a disk drive having an actuator arm. The actuator arm includes a first surface lying in a first plane, a second surface lying in a second plane and an outer edge. The conductor assembly includes a first trace segment, a second trace segment and one or more segment guides for urging the trace segments together between the first and second planes. Alternatively, the conductor assembly includes a first conductor platform that supports at least the first trace segment between the first and second planes. The conductor assembly can include a first platform step so that the first conductor platform is positioned parallel to the first and second planes. In an alternate embodiment, the first trace segment that has been reshaped to be positioned between the first and second planes.

33 Claims, 6 Drawing Sheets

CONDUCTOR ASSEMBLY FOR REDUCING TRACK MISREGISTRATION IN A DISK DRIVE

REFERENCE TO RELATED APPLICATION

The present application is a divisional application of U.S. patent application Ser. No. 09/877,507, filed on Jun. 8, 2001, now U.S. Pat. No. 7,023,665 and claims priority on co-pending U.S. patent application Ser. No. 09/877,507 under 35 U.S.C. § 120. To the extent permitted, the contents of U.S. patent application Ser. No. 09/877,507 are incorporated herein by reference.

FIELD OF THE INVENTION

The present invention relates generally to disk drives for storing data. More specifically, the present invention relates to a conductor assembly that reduces track misregistration in a disk drive.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular regions of different radii, commonly referred to as "tracks". Typically, a head stack assembly having a positioner and an E-block including an actuator hub is used to position a data transducer of a transducer assembly proximate each storage surface of each storage disk. The data transducer transfers information to and from the storage disk when precisely positioned on the appropriate track (also known as a "target track") of the storage surface. A conductor assembly, including one or more trace arrays, electrically connects each data transducer to a drive circuitry.

The need for increased storage capacity and compact construction of the disk drive has led to the use of disks having increased track density or decreased track pitch, i.e., more tracks per inch. As the tracks per inch increase, the ability to maintain the data transducer on the target track becomes more difficult. More specifically, as track density increases, it is necessary to reduce positioning error of the data transducer proportionally. With these systems, the accurate and stable positioning of the data transducer proximate the appropriate track is critical to the accurate transfer and/or retrieval of information from the rotating storage disks.

In addition, the desire to reduce data transfer times requires faster storage disk rotation. High-speed disk drives can include a disk assembly that rotates 7,200, 10,000, or 15,000 revolutions per minute, or higher. These rapidly rotating storage disks generate substantial air turbulence within the drive housing of the disk drive.

Prior art FIGS. 1A and 1B illustrate a portion of a prior art disk drive. More specifically, FIGS. 1A and 1B illustrate a conventional actuator arm 22P, a conductor assembly 32P including portions of two trace arrays 36P, and a transducer assembly 28P (shown only in FIG. 1A) that are secured to the actuator arm 22P. The trace arrays 36P are generally flexible structures that run from the data transducer 70P, along the actuator arm 22P (only a portion is shown in FIG. 1A), to the drive circuitry (not shown in FIGS. 1A and 1B). Each trace array 36P typically includes a flexible, middle span 72BP that bows away from the actuator arm 22P.

One of the major drawbacks of conventional flexible trace arrays is that the turbulent airflow in the disk drive causes the trace arrays 36P to be intermittently driven into resonance. This motion of the conductor assembly 32P can pull the data transducer 70P off-track, creating errors known as track misregistration. Specifically, the non-repeatable component of track misregistration, known as "non-repeatable runout" (NRRO) is particularly impacted by the air turbulence created by the storage disks. In fact, the extent of the track misregistration increases exponentially with higher storage disk rotation rates.

FIG. 1C is a graphical representation of the level of NRRO measured at various disk drive frequencies for the prior art conductor assembly 32P depicted in FIGS. 1A and 1B. FIG. 1C includes measurements for a first data transducer and a second data transducer (neither data transducer is shown in FIG. 1A or 1B) connected to one actuator arm that is positioned between two storage disks (not shown in FIG. 1A or 1B). The cumulative extent of the NRRO is a statistical summation of the NRRO across a specified frequency range. The mathematical algorithm for performing this summation is well known to those practiced in the art. As used herein, NRRO is a distance that is expressed as a percentage of the width of a data track, which can be 0.5 microns, for example. In short, a higher percentage equates to a higher level of NRRO. In contrast, a comparatively lower percentage corresponds to a lower level of NRRO, resulting in a decrease in track misregistration. The measured level of NRRO for the first data transducer was 8.98%. The measured level of NRRO for the second data transducer was 10.06%.

One attempt to solve the problem of air turbulence causing track misregistration includes providing "air dams" to divert airflow away from data transducers and other components of the disk drive. Unfortunately, this approach has not been entirely satisfactory. For example, air dams are typically only utilized in more costly disk drives because they can add considerable expense to the manufacturing process. Additionally, air dams can be cumbersome to incorporate into the manufacturing process and they can impose restrictions on the overall design of the disk drive.

In light of the above, the need exists to provide a disk drive that accurately positions the data transducers relative to the storage disks. Another need exists to provide a reliable, simple, and efficient method to effectively reduce the sensitivity of the conductor assembly to the turbulent airflow caused by the rotation of the storage disks. Still another need exists to provide a means of decreasing the amount of airflow-induced excitation or resonance of the conductor assembly. Yet another need exists to provide a way to reduce or eliminate the non-repeatable component of track misregistration caused by the turbulent airflow of the disk drive.

SUMMARY

The present invention is directed to a conductor assembly for a disk drive that satisfies these needs. In each of the embodiments provided herein, the disk drive includes one or more storage disks, one or more transducer assemblies, a drive circuitry, an actuator arm, and the conductor assembly. Further, in each embodiment, the conductor assembly carries electrical signals between the transducer assemblies and the drive circuitry. The actuator arm includes a first surface lying in a first plane, a second surface lying in a second plane, and an outer edge. As provided herein, the conductor assembly is preferably positioned along the outer edge of the actuator arm.

In a first embodiment, the conductor assembly includes a first trace segment and a second trace segment that are positioned substantially along the actuator arm. Each of the trace segments includes a proximal region, a middle span and a distal region. In this embodiment, the conductor assembly also includes one or more segment guides for urging the first trace segment and the second trace segment together so that the middle span of each trace segment is positioned substantially between the first plane and the second plane. As an example, the segment guides can be adhesive pads that adhere to the trace segments. Alternatively, in a second embodiment, the segment guides can be secured to the actuator arm. With these designs, the trace segments are substantially shielded from the airflow generated by rotation of the storage disks.

In a third embodiment, the first trace segment is positioned substantially along the actuator arm. The conductor assembly also includes a first conductor platform for supporting at least a portion of the first trace segment. The first conductor platform positions at least a portion of the first trace segment substantially between the first plane and the second plane. Moreover, the conductor assembly can include a plurality of trace segments, with each trace segment being supported by a separate conductor platform so that each trace segment is positioned substantially between the first plane and the second plane.

In addition to the features of the third embodiment, a fourth embodiment includes a platform step for each conductor platform. The platform steps are positioned substantially between the first plane and the second plane. The first platform step allows the first conductor platform to be positioned substantially parallel to and between the first and second planes.

A fifth embodiment of the conductor assembly can be implemented into any of the previous embodiments. Alternatively, this embodiment can be constructed independent of the above embodiments. The fifth embodiment includes at least one trace segment including a first trace segment that is positioned substantially along the actuator arm. The trace segments each include a proximal region, a middle span and a distal region. Uniquely, at least a portion of the middle span of each trace segment has been formed to be positioned substantially between the first plane and the second plane. The forming process can vary, but can include heating and shaping the trace segments as necessary, or using materials which are conducive to being more easily formed, and better retain their shape.

The described embodiments reduce the amount air turbulence that reaches the conductor assembly, thereby decreasing track misregistration in the disk drive. Consequently, a more efficient disk drive is provided due to the ability to increase rotation rates of the storage disks without impacting data transfer accuracy of the disk drive.

The present invention also includes a method for reducing the amount of track misregistration in a disk drive. The method includes the steps of providing a head stack assembly including an actuator arm having a first surface lying in a first plane and a second surface lying in a second plane, and positioning a first trace segment having a proximal region, a middle span and a distal region along the actuator arm so that the middle span is substantially between the first plane and the second plane.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 2:
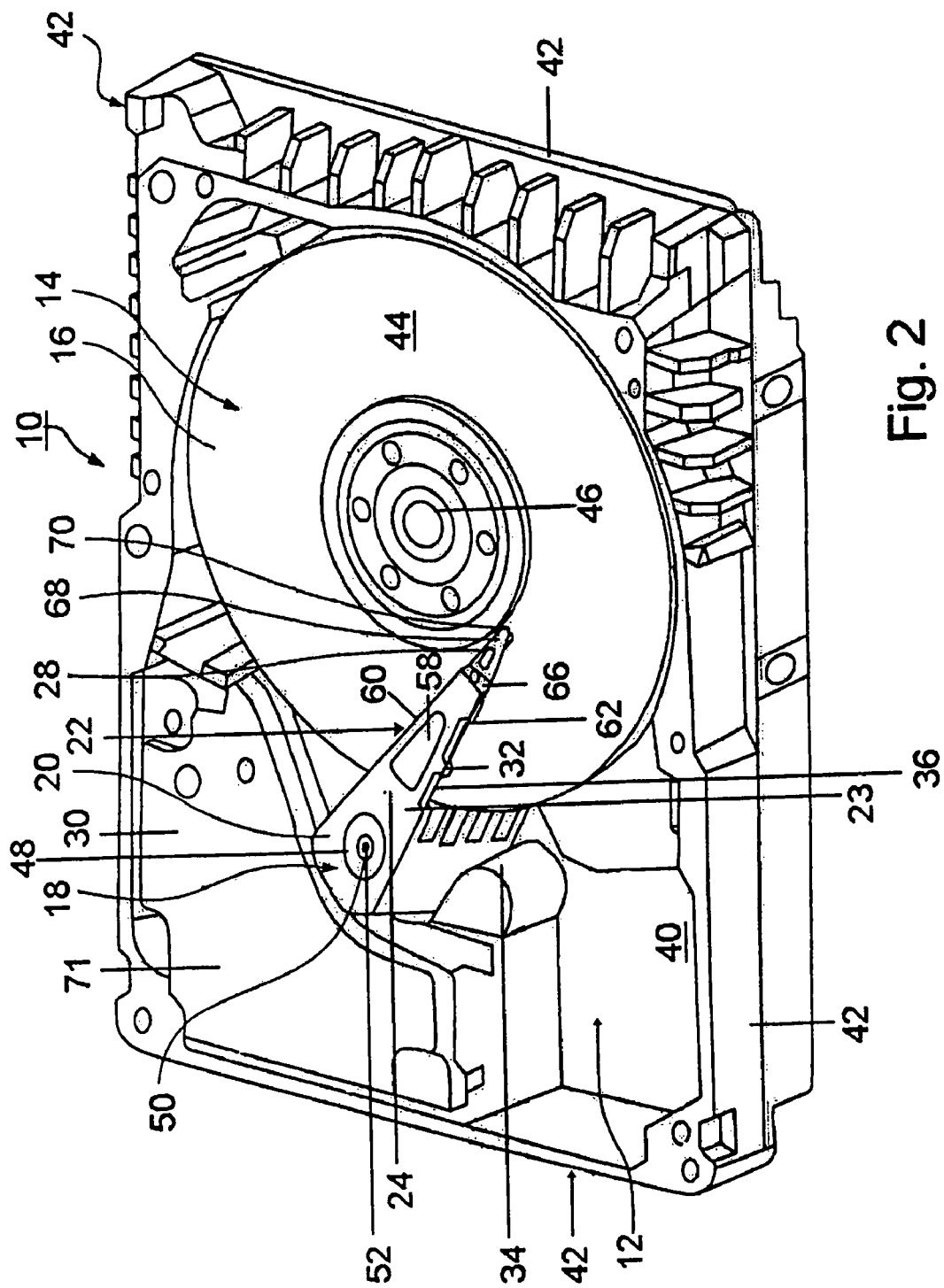
FIG. 2 is a perspective view of a disk drive having features of the present invention.

Referring initially to FIG. 2, a disk drive 10 according to the present invention includes a drive housing 12, a disk assembly 14 including one or more storage disks 16, and a head stack assembly 18 including (i) an E-block 20 with one or more actuator arms 22 that each have a first surface 23 lying in a first plane 24 and a second surface 25 lying in a second plane 26 (not shown on FIG. 2), (ii) one or more transducer assemblies 28 secured to each actuator arm 22, (iii) a positioner 30, and (iv) a conductor assembly 32 for conveying electrical signals between the transducer assembly 28 and a drive circuitry 34. The conductor assembly 32 includes one or more trace arrays 36, each having a trace segment 38 that is generally situated along the actuator arm 22, as illustrated in the embodiments shown in FIGS. 3A, 5A, 6 and 7A.

Uniquely, each trace segment 38 is positioned substantially between the first plane 24 and the second plane 26 of one of the actuator arms 22. With this design, the actuator arm 22 inhibits airflow generated by the rotating storage disks 16 from exciting the conductor assembly 32. Thus, airflow-induced excitation of the conductor assembly 32 is decreased, resulting in an overall reduction the non-repeatable component of track misregistration ("non-repeatable runout" or "NRRO"). Consequently, the conductor assembly 32 of the present invention can increase the accuracy and efficiency of the disk drive 10.

A detailed description of the various components of a disk drive 10 is provided in U.S. Pat. No. 5,319,511, issued to Lin. The contents of U.S. Pat. No. 5,319,511 are incorporated herein by reference.

The drive housing 12 retains the various components of the disk drive 10. The drive housing 12, illustrated in FIG. 2, includes a base 40 and four (4) side walls 42. A typical drive housing also includes a cover (not shown for clarity), which is spaced apart from the base 40 by the side walls 42.

The disk assembly 14 includes one or more storage disks 16 that store data in a form that can be subsequently retrieved if necessary. A magnetic storage disk 16 is commonly used in this capacity. Alternately, for example, each storage disk 16 can be optical or magneto-optical. For conservation of space, each storage disk 16 preferably includes a data storage surface 44 on each side of the storage disk 16. These storage surfaces 44 are typically divided into a plurality of narrow, annular regions (not shown) of different radii, commonly referred to as "tracks." Those skilled in the art will recognize that the present invention is capable of being used in a disk drive 10 having one or more storage disks 16. For example, the disk drive 10 can include four (4) to twelve (12) or more spaced-apart storage disks 16.

The storage disks 16 are rotated on a disk spindle 46 that is journalled to the drive housing 12 and rotates about a spindle axis (not shown) relative to the drive housing 12. The disk spindle 46 is rotated at a predetermined angular velocity by a disk motor (not shown). The rotation rate of the storage disks 16 varies according to the design of the disk drive 10. Rotation of the storage disks 16 generates a complex pattern of airflow between the storage disks 16 that moves in varying directions relative to the storage disks 16.

Figure 4:
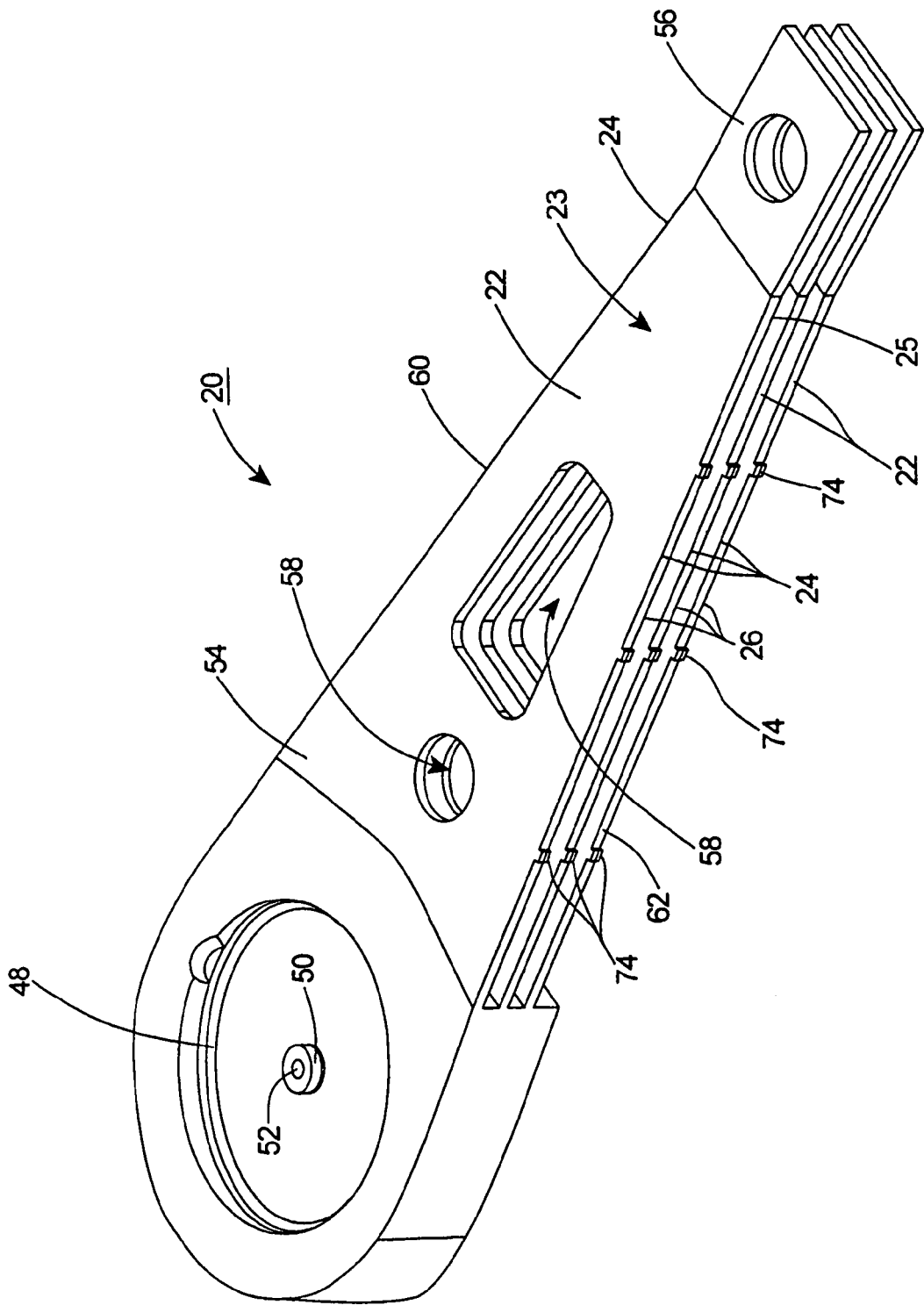
FIG. 4 is a simplified perspective view of a portion of an E-block including actuator arms having features of a second embodiment of the present invention.

As can best be seen with reference to FIGS. 2 and 4, the E-block 20 includes an actuator hub 48 and the substantially parallel, spaced apart, actuator arms 22 that are attached to and cantilever from the actuator hub 48. As illustrated in FIG. 4, the actuator hub 48 is substantially tubular and can be mounted to an actuator shaft 50. The actuator hub 48 rotates around an E-block pivot center 52 relative to the actuator shaft 50 on an actuator bearing assembly (not shown).

The actuator arms 22 move with the actuator hub 48 and position the transducer assemblies 28 between the storage disks 16, proximate the storage surfaces 44. Each actuator arm 22 includes a proximal section 54 that is secured to the actuator hub 48 and a distal section 56 that cantilevers away from the actuator hub 48. The actuator arms 22 can include one or more arm apertures 58 for decreasing the weight of the actuator arm 22, as illustrated in FIGS. 2 and 4. The spacing of the actuator arms 22 varies according to the spacing of the storage disks 16. The distance between consecutive actuator arms 22 is typically between about two millimeters (2 mm) to four millimeters (4 mm).

Additionally, as illustrated in FIGS. 3A, 4, 5A, 5B, 6 and 7A for example, each actuator arm 22 includes the first surface 23 lying in the first plane 24 and the spaced-apart second surface 25 lying in the second plane 26. The first and second planes 24, 26, are generally parallel to each other and to the storage disks 16. Although the Figures designate a particular surface of the actuator arm 22 being in the first plane 24 and the second plane 26, either surface can be the first plane 24 or the second plane 26.

Each actuator arm 22 also includes an inner edge 60 and an outer edge 62. The orientation of the inner edge 60 and the outer edge 62 can vary. The inner edge 60 and the outer edge 62 are generally perpendicular to the storage disks 16 and to the first plane 24 and the second plane 26. The inner edge 60 is positioned closer to the disk spindle 46 than the outer edge 62, as best illustrated in FIG. 2. Further, each actuator arm 22 includes one or more baseplates 64 for securing one or more of the transducer assemblies 28 to the actuator arm 22.

The transducer assemblies 28 transfer or transmit information between the computer (not shown) or disk drive array (not shown) and the storage disks 16. Typically, each transducer assembly 28 includes a load beam 66, a flexure 68, and a data transducer 70. The load beam 66 attaches the flexure 68 and the data transducer 70 to the baseplate 64 of the actuator arm 22. Preferably, each load beam 66 is flexible in a direction perpendicular to the storage disk 16 and acts as a spring for supporting the data transducer 70.

Each flexure 68 is used to attach one (1) of the data transducers 70 to one (1) of the load beams 66. Each data transducer 70 interacts with one (1) of the storage disks 16 to access or transfer information to the storage disk 16. For a magnetic storage disk 16, the data transducer 70 is commonly referred to as a read/write head.

The positioner 30 precisely moves the actuator hub 48, the actuator arms 22 and the data transducers 70 relative to the storage disks 16. The positioner 30 moves the actuator arms 22 over the tracks on the storage disks 16. The positioner 30 can be implemented in a number of alternate ways. For example, the positioner 30 can be a rotary voice coil motor or a linear motor.

Only a portion of the positioner 30 is illustrated in FIG. 2. In this embodiment, the positioner 30 is a rotary motor and includes a flat, roughly trapezoidal coil (not shown) that is coupled to the actuator hub 48. The shape of the coil can vary depending upon the requirements of the head stack assembly 18. The coil is disposed between a pair of spaced apart permanent magnets (not shown) and a pair of spaced apart flux return plates 71 (only one is shown in FIG. 2) which are secured to the drive housing 12. The magnets have pole faces (not shown) of opposite polarity directly facing opposite legs of the coil. The resultant magnetic fields (not shown) are such that current passing through the coil in one direction causes rotation of the actuator arms in one radial direction relative to the storage disks 16 (such as the radially outward direction) while reverse current causes reverse direction movement (such as the radially inward direction). Thus, the positioner 30 is able to bi-directionally rotate the head stack assembly 18 relative to the drive housing 12 around the E-block pivot center 52.

The conductor assembly 32 structurally and electrically connects each data transducer 70 to the drive circuitry 34. The design of the conductor assembly 32 can vary depending upon the requirements of the head stack assembly 18 and the disk drive 10. For example, FIGS. 3A, 4, 5A-5B, 6 and 7A illustrate five different embodiments. In each of these embodiments, the conductor assembly 32 includes at least a first trace segment 38A for each actuator arm 22 in the disk drive 10. Each trace segment 38 carries electrical signals along a portion of the trace array 36 between one of the transducer assemblies 28 and the drive circuitry 34. The materials which form the trace segments 38 can vary depending upon the requirements of the disk drive 10. The trace segments 38 can be formed from copper or other suitable metals, and can also include a substrate material such as polyimide or other appropriate plastics or metals, as examples.

Each trace segment 38 includes a distal region 72A, a middle span 72B (not shown in FIGS. 4 and 6), and a proximal region 72C. The precise locations of the distal region 72A, the middle span 72B, and the proximal region 72C can vary depending upon the design of the head stack assembly 18.

The distal region 72A spans from a load end 73A of the baseplate 64 (the end nearest the transducer assembly 28) to an arm end 73B of the baseplate 64 (the end nearest the actuator hub 48). The middle span 72B is supported by the actuator arm 22 only at a first span end 75A and a second span end 75B. The first span end 75A is located at the arm end 73B of the baseplate 64. The second span end 75B is located along the actuator arm 22 at a first attachment point that structurally secures the middle span 72B to the actuator arm 22. The location of the second span end 75B can vary depending upon the configuration of the actuator arm 22. The middle span 72B is susceptible to influence by air turbulence, because with the exception of the span ends 75A, 75B, the middle span 72B is substantially unsupported by the actuator arm 22. The proximal region 72C extends from the second span end 75B of the middle span 72B to approximately adjacent to the actuator hub 48.

Figure 3A:
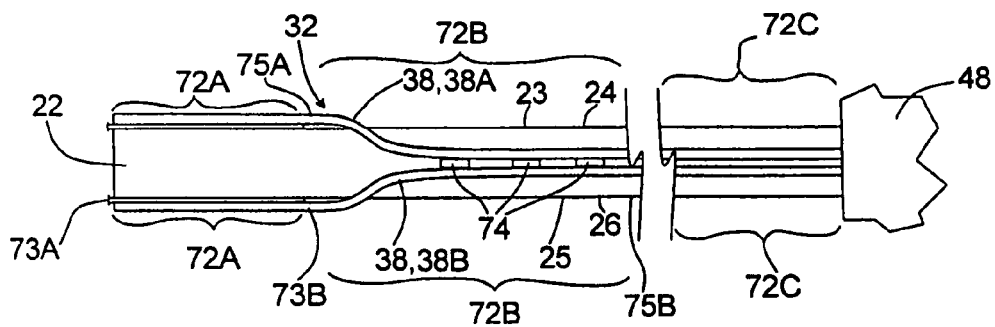
FIG. 3A is a partial cutaway, side illustration of a portion of a first embodiment of a conductor assembly and an actuator arm having features of the present invention.

A first embodiment of the conductor assembly 32 is illustrated in FIG. 3A. In this embodiment, the conductor assembly 32 includes at least the first trace segment 38A and a second trace segment 38B. Additional trace segments (not shown) can also be used with the present invention. The second trace segment 38B also includes the middle span 72B that is generally unsupported by the actuator arm 22. In this embodiment, the design and quantity of the trace segments 38A, 38B, can vary depending upon the requirements of the disk drive 10. Each trace segment 38A, 38B, forms a portion of the trace array 36 (only partially shown in FIG. 3A). The trace array 36 preferably extends from one of the data transducers 70, substantially along the actuator arm 22, to the drive circuitry 34 of the disk drive 10.

As illustrated in FIG. 3A, the first trace segment 38A and the second trace segment 38B are positioned substantially along one of the actuator arms 22. The trace segments 38A, 38B, normally extend from near the baseplate 64 toward the actuator hub 48. Preferably, the trace segments 38A, 38B, are positioned substantially along the outer edge 62 of the actuator arm 22. With this design, the trace segments 38A, 38B, are less accessible to airflow generated by the rotating storage disks 16 because the airflow typically moves in the direction from the disk spindle 46 toward the perimeter of the storage disks 16, or from the inner edge 60 toward the outer edge 62 of the actuator arm 22. Therefore, positioning of the trace segments 38A, 38B, adjacent to the outer edge 62 of the actuator arm 22 allows the trace segments 38A, 38B, to be shielded from the airflow behind the actuator arm 22.

Additionally, the conductor assembly 32 of FIG. 3A also includes one or more segment guides 74 that urge the first trace segment 38A and the second trace segment 38B together. The segment guides 74 in FIG. 3A extend between the trace segments 38A, 38B, and adhere the middle span 72B of the first trace segment 38A and the middle span 72B of the second trace segment 38B together, in effect stiffening the middle span 72B of each of the trace segments 38A, 38B. By "stiffening" the trace segments 38A, 38B, in this manner, less unwanted movement of the middle span 72B occurs.

In this embodiment, the segment guides urge the middle span 72B of each trace segment 38A, 38B, to be positioned substantially between the first plane 24 and the second plane 26. Preferably, at least approximately 40 percent (40%) of the middle span 72B is positioned between the first plane 24 and the second plane 26. More preferably, at least approximately 60 percent (60%) of the middle span 72B is positioned between the first plane 24 and the second plane 26. Even more preferably, at least approximately 80 percent (80%) of the middle span 72B is positioned between the first plane 24 and the second plane 26. Most preferably, at least approximately 90 percent (90%) of the middle span 72B is positioned between the first plane 24 and the second plane 26.

In this manner, the trace segments 38A, 38B, are more resistant to unwanted resonance due to airflow from the rotating storage disks 16. Moreover, positioning the middle span 72B of each trace segment 38A, 38B, along the outer edge 62 of the actuator arm 22 effectively blocks a substantial amount of the air turbulence from reaching the middle span 72B of each of the trace segments 38A, 38B. As a consequence, track misregistration is significantly decreased. Alternately, each trace segment 38A, 38B could be positioned along the inner edge 60 of the respective actuator arm.

The design of the segment guide 74 can vary depending upon the requirements of the head stack assembly 18 and the disk drive 10. For example, the segment guide 74 can be an adhesive material such as adhesive tape, or other suitable materials that attract the trace segments 38A, 38B, together. The number of segment guides 74 can vary depending upon the requirements of the conductor assembly 32, the length of the actuator arm 22, and the materials that form the trace segments 38A, 38B.

Figure 3B:
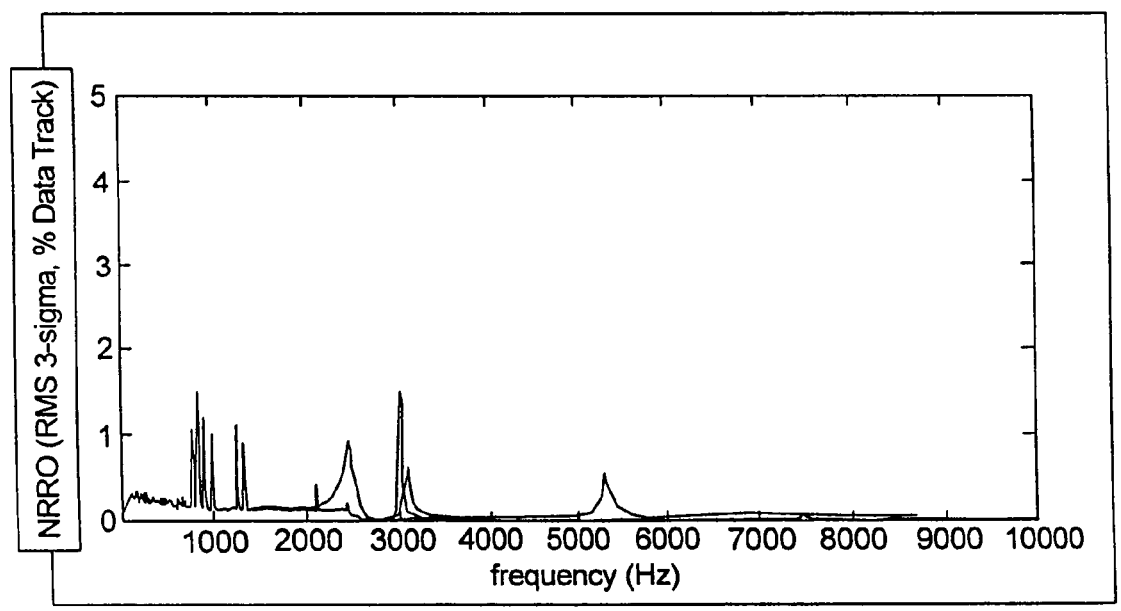
FIG. 3B is a graphical representation of frequency versus NRRO of the disk drive including the first embodiment of the present invention as illustrated in FIG. 3A.

Referring now to FIG. 3B, NRRO was measured at various frequencies for the embodiment illustrated in FIG. 3A. Somewhat similar to the experimental data provided above relative to the prior art, the testing included measurements for a first data transducer and a second data transducer (neither data transducer is shown in FIG. 3A) extending from one actuator arm 22 that is positioned between two storage disks 16 (not shown in FIG. 3A). The percent NRRO is calculated in order to compare the level of the non-repeatable component of track misregistration to a disk drive having a conventional conductor assembly 32P. FIG. 3B indicates that for the first data transducer, the percentage of NRRO was 4.89%, while for the second data transducer the percentage of NRRO was 5.58%. Both of these percentages are significantly lower than the percentages for the prior art disk drive with the conventional conductor assembly 32P of 8.98% and 10.06%, respectively.

Figure 1A:
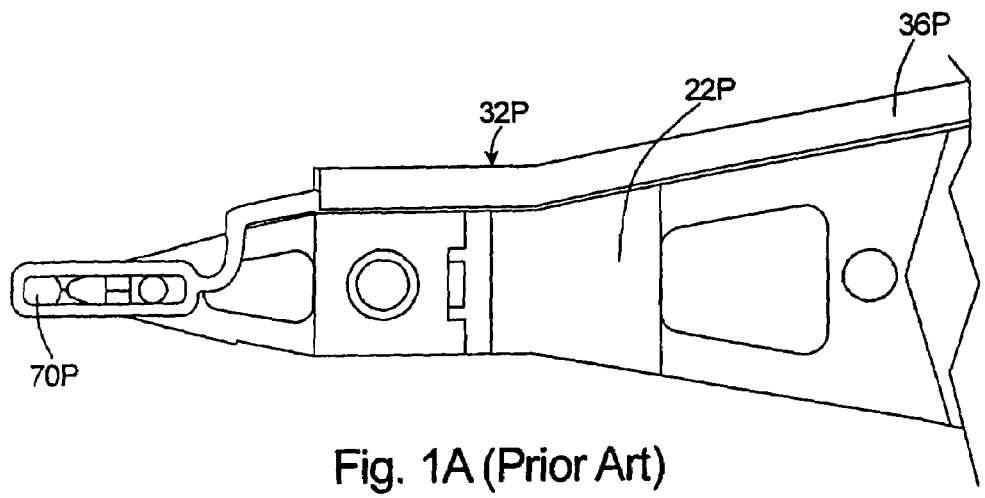
FIG. 1A is a simplified, top view of a portion of a prior art head stack assembly including a prior art conductor assembly.
Figure 1B:
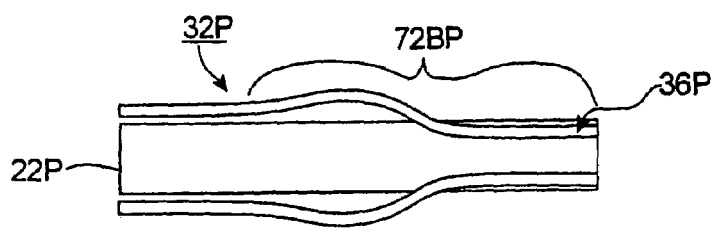
FIG. 1B is a side illustration of a portion of a prior art actuator arm and a portion of the prior art conductor assembly of FIG. 1A.
Figure 1C:
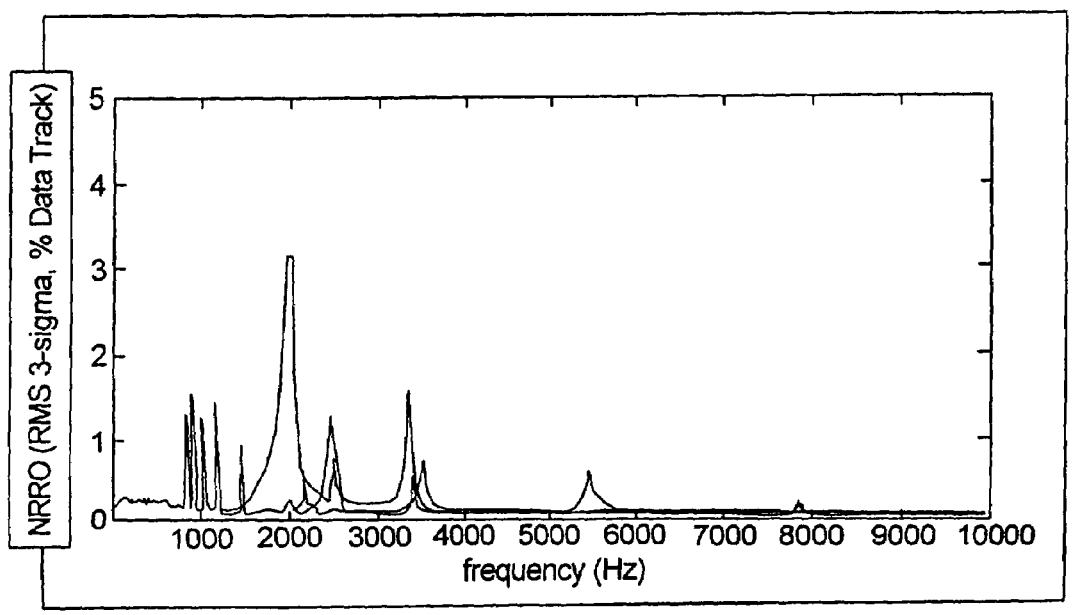
FIG. 1C is a graphical representation of frequency versus non-repeatable runout (NRRO) of a prior art disk drive including the prior art actuator arm and pair of conductors of FIGS. 1A and 1B.

More specifically, this decrease in NRRO is substantially related to a reduction in height of the peak at approximately 2,000 Hertz. The peak at about 2,000 Hertz on FIG. 1C of greater than 3% has been effectively reduced to less than 1% at the same frequency on FIG. 3B. Because this frequency can be directly attributed to the conductor assembly 32, a causal link between the features of the present invention and decreased NRRO is established. Thus, experimental data confirms that the present invention substantially reduces non-repeatable runout, thereby providing a higher positioner bandwidth.

Alternatively, in a second embodiment, the segment guides 74 can be secured to the actuator arms 22, as illustrated in FIG. 4 (trace segments are omitted for clarity). In this embodiment, segment guides 74 can be secured near the first surface 23, the second surface 25 or both surfaces 23, 25, of the actuator arm 22. With this design, the segment guides 74 urge the trace segments 38A, 38B, toward each other, preferably along the outer edge 62 of the actuator arm 22, and between the first plane 24 and the second plane 26. Basically, the segment guides 74 guide the trace segments 38A, 38B, to be positioned between the segment guides 74 along the actuator arm 22.

Alternatively, the segment guides 74 can be squeezed together to force the trace segments 38A, 38B, to contact each other between the segment guides 74. In so doing, motion of the trace segments 38A, 38B, would be effectively inhibited or eliminated. With these designs, the segment guides 74 urge the middle span 72B of each trace segment 38A, 38B, to remain substantially between the first plane 24 and the second plane 26. Similar to the first embodiment above, as well as the remaining embodiments, the conductor assembly can include any number of trace segments 38.

The number of segment guides 74 can vary, depending upon the requirements of the head stack assembly 18 and the disk drive 10. For example, FIG. 4 shows each actuator arm 22 having six (6) segment guides 74, with three (3) mounted near the first surface 23 and three (3) mounted near the second surface 25 of each actuator arm 22. Alternatively, the present invention can include more or less than six segment guides 74.

The segment guides 74 illustrated in the embodiment of FIG. 4 can be separate structures that are secured to the actuator arms 22. Alternatively, the segment guides 74 can be formed as a unitary part of the actuator arms 22 or other components of the E-block 20. The materials used for the segment guides 74 in this embodiment can vary, although aluminum, other metals, or plastics are suitable for use with the present invention.

Figure 5A:
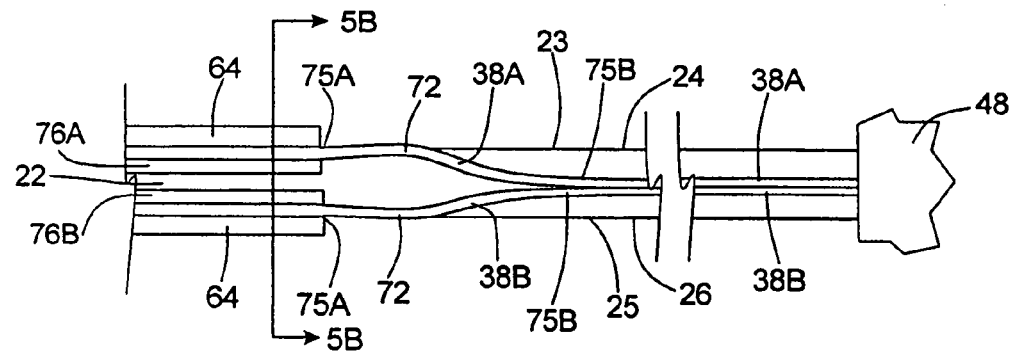
FIG. 5A is a partial cutaway, side view illustration of a portion of a third embodiment of the conductor assembly and the actuator arm having features of the present invention.
Figure 5B:
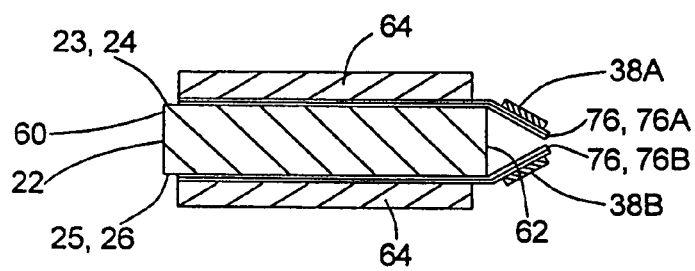
FIG. 5B is a cross-sectional view taken at line 5B-5B of FIG. 5A.

FIGS. 5A and 5B illustrate a third embodiment of the present invention. In this embodiment, a first trace segment 38A is positioned at least partially on one or more conductor platforms 76. This embodiment can also include a second trace segment 38B, as shown in FIGS. 5A and 5B. The design of the conductor platforms 76 can be varied to suit the requirements of the E-block 20. For example, in the embodiment illustrated in FIGS. 5A and 5B, the conductor platforms 76 are positioned between the baseplate 64 and the actuator arm 22. In this example, the conductor platforms 76 cantilever away from the outer edge 62 of the actuator arm 22. Alternatively, the conductor platforms 76 can be formed as a unitary structure with the actuator arms 22 or the baseplates 64. Moreover, the conductor platforms 76 can be separate structures that are secured to either the actuator arm 22, the baseplate 64, or both.

The number of conductor platforms 76 for each actuator arm 22 can vary depending upon the requirements of the head stack assembly 18 and the disk drive 10. As shown in FIGS. 5A and 5B, the first trace segment 38A is positioned partially on a first conductor platform 76A, while the second trace segment 38B is positioned partially on a second conductor platform 76B. Alternatively, the conductor assembly 32 can include only a first conductor platform 76A for each actuator arm 22.

The conductor platforms 76A, 76B can be angled to support the trace segments 38A, 38B, between the first plane 24 and the second plane 26. In the embodiment illustrated in FIG. 5B, the first conductor platform 76A is angled from the first plane 24 toward the second plane 26, while the second conductor platform 76B is angled from the second plane 26 toward the first plane 24. With this design, the trace segments 38A, 38B, are maintained substantially between the first plane 24 and the second plane 26. As a result, the trace segments 38A, 38B, effectively utilize the actuator arm 22 and the conductor platforms 76A, 76B, as a wind block, thereby decreasing track misregistration as provided above. Moreover, the conductor platforms 76A, 76B, in effect lower the profile of the middle span 72B of each trace segment 38A, 38B, reducing the susceptibility of the trace segments 38A, 38B, to be subjected to air turbulence from the rotating storage disks 16.

Figure 5C:
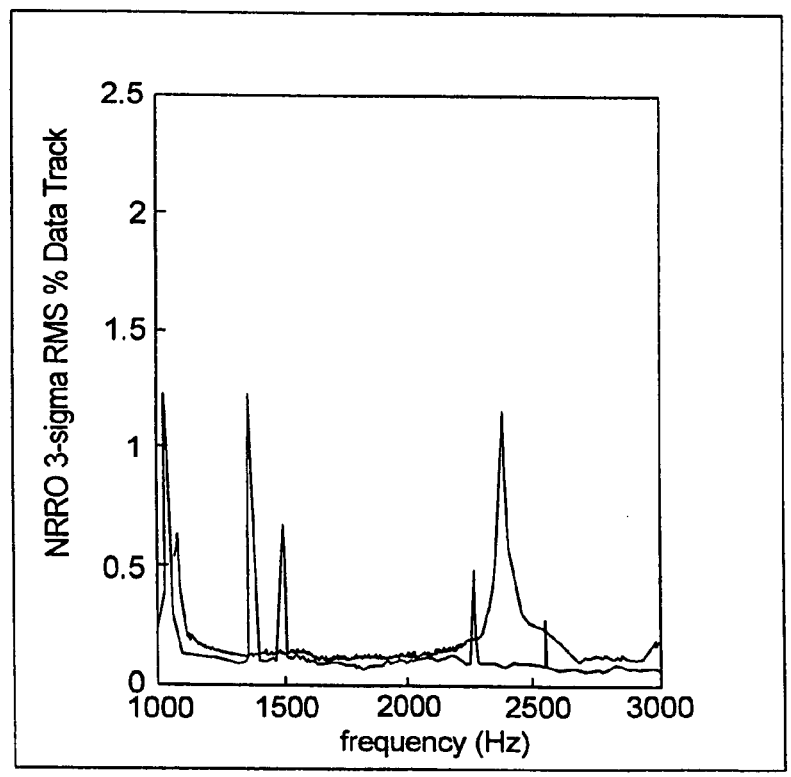
FIG. 5C is a graphical representation of frequency versus NRRO of the disk drive including the third embodiment of the present invention as illustrated in FIGS. 5A and 5B.

FIG. 5C shows a graph of experimental data in which NRRO was measured at various frequencies for the embodiment illustrated in FIGS. 5A and 5B. Similar to the experimental data provided for the embodiment in FIG. 3A above, the testing included measurements for a first data transducer and a second data transducer (neither data transducer is shown in FIG. 5A or 5B) extending from one actuator arm 22 that is positioned between two storage disks 16 (not shown in FIG. 5A or 5B). The percent NRRO is calculated in order to determine the level of the non-repeatable component of track misregistration. FIG. 5C indicates that for the first data transducer, the percentage was 5.13%, while for the second data transducer the percentage was 5.39%. Both of these percentages are significantly lower than the percentages for the prior art disk drive, as indicated above. Thus, the present invention substantially reduces track misregistration, thereby providing a greater degree of accuracy of the positioner 30.

In particular, this decrease in NRRO is substantially related to a reduction in height of the peak at approximately 2,000 Hertz. The peak at about 2,000 Hertz on FIG. 1C of greater than 3% has been effectively reduced to less than 1% at the same frequency on FIG. 5C. Because this frequency can be directly attributed to the conductor assembly 32, a causal link between the features of the present invention and decreased NRRO is established. Thus, experimental data confirms that the present invention substantially reduces non-repeatable runout, thereby providing a higher positioner bandwidth.

Figure 6:
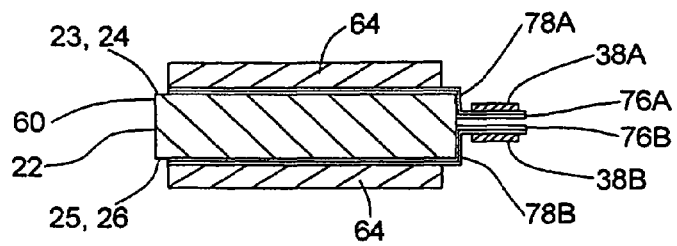
FIG. 6 is a cross-sectional view of a fourth embodiment of the conductor assembly and the actuator arm having features of the present invention.

Alternatively, in a fourth embodiment, the conductor platforms 76A, 76B, are substantially parallel to the first plane 24 and the second plane 26. This alternate embodiment is illustrated in FIG. 6. In this embodiment, the first conductor platform 76A includes a first platform step 78A and the second conductor platform 76B includes a second platform step 78B. The number of conductor platforms 76, can vary, preferably resulting in a corresponding number of platform steps 78. In the embodiment shown in FIG. 6, the platform steps 78A, 78B, are substantially perpendicular to the first plane 24 and the second plane 26. Moreover, the platform steps 78A, 78B, are positioned near the outer edge 62 of the actuator arm 22, although other positioning of the platform steps 78A, 78B, is possible with the present invention.

With this design, the trace segments 38A, 38B, are positioned on the outer edge 62, between the first plane 24 and the second plane 26. In this manner, the trace segments 38A, 38B, are substantially shielded from the airflow generated by the rotating storage disks 16. Further, the middle span 72B of each trace segment 38A, 38B, is urged between the first plane 24 and the second plane 26, thereby decreasing the length of the trace segment 38A, 38B, that is subjected to air turbulence.

Figure 7A:
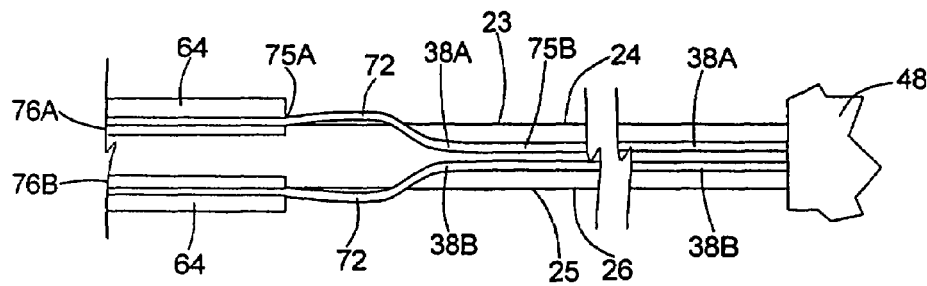
FIG. 7A is partial cutaway, side illustration of a portion of a fifth embodiment of the conductor assembly and the actuator arm having features of the present invention.

A fifth embodiment of the present invention is illustrated in FIG. 7A. In this embodiment, the conductor assembly 32 includes the first trace segment 38A and the second trace segment 38B, which have been treated and reformed so that a greater percentage of the length of each trace segment 38A, 38B, is shielded from air turbulence by the actuator arm 22. Preferably the trace segments 38A, 38B, are reformed at least in the unsupported middle span 72B to reduce the tendency of the trace segments 38A, 38B, to bow out above the planes 24, 26, of the actuator arm 22.

The type of treatment used to reform the trace segments 38A, 38B, can vary. For example, the trace segments 38A, 38B, can be heated and reformed to more closely follow the contour of the actuator arm 22. In this manner, the trace segments 38A, 38B, substantially retains their flexibility, while at the same time taking advantage of the wind block provided by the actuator arm 22.

Moreover, providing trace segments 38A, 38B, that have been reformed can be combined with other embodiments provided above. For instance, FIG. 7A shows the treated and reformed trace segments 38A, 38B, in conjunction with the conductor platforms 76A, 76B. One method for enabling the reformation of the trace segments 38A, 38B, is to apply heat at a point along the trace segments 38A, 38B, near the conductor platforms 76A, 76B. By reforming the trace segments 38A, 38B, to maintain a greater portion between the planes 24, 26, of the actuator arm 22, the trace segments 38A, 38B, have much less exposure to the turbulent airflow generated from rotation of the storage disks 16. By combining these embodiments, a further decrease in track misregistration is realized. Other combinations of the embodiments of the present invention can also be utilized with similar results.

Figure 7B:
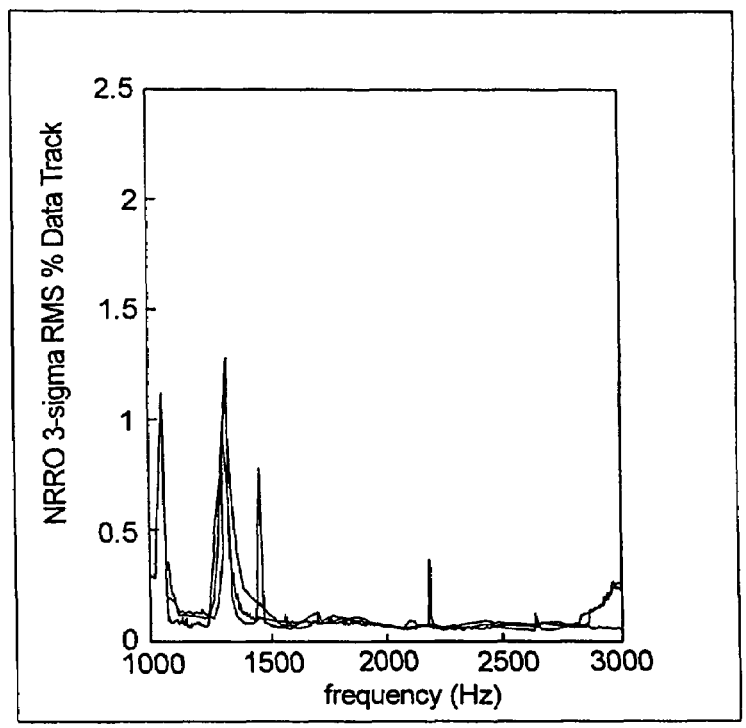
FIG. 7B is a graphical representation of frequency versus NRRO of a disk drive including the fifth embodiment of the present invention as illustrated in FIG. 7A.

FIG. 7B is a graph of experimental data in which NRRO was measured at various frequencies for the embodiment illustrated in FIG. 7A. Similar to the experimental data provided for the embodiment in FIGS. 3A and 5A above, the testing included measurements for a first data transducer and a second data transducer (neither data transducer is shown in FIG. 7A) extending from one actuator arm 22 that is positioned between two storage disks 16 (not shown in FIG. 7A). The percent NRRO is calculated in order to determine the level of the non-repeatable component of track misregistration. FIG. 7B indicates that for the first data transducer, the percentage was 4.59%, while for the second data transducer the percentage was 4.60%. Both of these percentages are significantly lower than the percentages for the prior art disk drive, as indicated above. In addition, these percentages show a further decrease in non-repeatable runout when combining embodiments of the present invention.

While the particular conductor assembly 32 and disk drive 10, as herein shown and disclosed in detail, are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
    a drive circuitry;
    a data transducer;
    an actuator arm having a first surface defining a first plane, a second surface defining a second plane, and an outer edge extending between the first surface and the second surface;
    a load beam;
    a base plate that secures the load beam to the actuator arm;
    a conductor assembly that transmits electrical signals between the drive circuitry and the data transducer, the conductor assembly including a first trace segment; and
    a first conductor platform that supports a portion of the first trace segment, the first conductor platform being at least partially positioned between the baseplate and the load beam.

2. The disk drive of claim 1 wherein the first plane and the second plane are substantially parallel to one another.

3. The disk drive of claim 1 wherein the first conductor platform extends away from the actuator arm at an angle that is non-parallel with the first plane.

4. The disk drive of claim 1 wherein the first conductor platform extends away from the outer edge at an angle from the first plane toward the second plane.

5. The disk drive of claim 1 further comprising a second conductor platform, and wherein the conductor assembly includes a second trace segment that is supported by the second conductor platform.

6. The disk drive of claim 5 wherein the second conductor platform is positioned in a non-parallel manner relative to the first conductor platform.

7. The disk drive of claim 5 wherein the first and second conductor platforms are spaced apart from one another.

8. The disk drive of claim 1, in which the first conductor platform extends away from the actuator arm in a non-perpendicular direction relative to the outer edge so that the portion of the first trace segment is positioned substantially between the first plane and the second plane.

9. A disk drive comprising:
    a drive circuitry;
    a data transducer;
    an actuator arm having a first surface defining a first plane, a second surface defining a second plane, and an outer edge extending between the first surface and the second surface;
    a load beam;
    a baseplate that secures the load beam to the actuator arm;
    a conductor assembly that transmits electrical signals between the drive circuitry and the data transducer, the conductor assembly including a first trace segment; and
    a conductor platform that supports a portion of the first trace segment, the conductor platform being formed as a unitary structure with the baseplate.

10. The disk drive of claim 9 wherein the first plane and the second plane are substantially parallel to one another.

11. The disk drive of claim 9 wherein the first conductor platform positions the portion of the first segment substantially between the first plane and the second plane.

12. The disk drive of claim 9 further comprising a second conductor platform, and wherein the conductor assembly includes a second trace segment that is supported by the second conductor platform.

13. The disk drive of claim 12 wherein the second conductor platform is positioned in a non-parallel manner relative to the first conductor platform.

14. The disk drive of claim 12 wherein the first and second conductor platforms are spaced apart from one another.

15. The disk drive of claim 9 further comprising a load beam and a baseplate that secures the load beam to the actuator arm, wherein the first conductor platform extends away from the actuator arm at a non-parallel angle relative to the first plane.

16. The disk drive of claim 9 wherein the first conductor platform extends away from the actuator arm in a non-perpendicular direction relative to the outer edge.

17. The disk drive of claim 9 wherein the first conductor platform extends away from the outer edge at an angle from the first plane toward the second plane.

18. A disk drive comprising:
    a drive circuitry;
    a data transducer;
    an actuator arm having a first surface, a second surface and an outer edge extending between the first surface and the second surface;
    a conductor assembly that transmits electrical signals between the drive circuitry and the data transducer, the conductor assembly including a first trace segment and a spaced apart second trace segment; and
    a first conductor platform that supports a portion of the first trace segment; and
    a second conductor platform that supports a portion of the second trace segment to maintain a spacing between the portions of the trace segments, the second conductor platform being positioned at an angle relative to the first conductor platform.

19. The disk drive of claim 18 wherein the first conductor platform is positioned to be non-parallel relative to the first plane and the second conductor platform is positioned to be non-parallel relative to the second plane.

20. The disk drive of claim 18 wherein the second conductor platform is spaced apart from the first conductor platform.

21. The disk drive of claim 18 further comprising a load beam and a baseplate that secures the load beam to the actuator arm, wherein the first conductor platform is at least partially positioned between the baseplate and the load beam.

22. The disk drive of claim 18 further comprising a load beam and a baseplate that secures the load beam to the actuator arm, wherein the first conductor platform is formed as a unitary structure with the actuator arm.

23. The disk drive of claim 18 further comprising a load beam and a baseplate that secures the load beam to the actuator arm, wherein the first conductor platform is formed as a unitary structure with the baseplate.

24. The disk drive of claim 18 wherein the first surface defines a first plane and the second surface defines a second plane, and wherein the first conductor platform extends away from the outer edge at an angle from the first plane toward the second plane, and the second conductor platform extends away from the outer edge at an angle from the second plane toward the first plane.

25. A disk drive comprising:
a drive circuitry;
a data transducer;
an actuator arm having a first surface defining a first plane, a second surface defining a second plane, and an outer edge extending between the first surface and the second surface;
a conductor assembly that transmits electrical signals between the drive circuitry and the data transducer, the conductor assembly including a first trace segment and a spaced apart second trace segment; and
a first conductor platform that supports a portion of the first trace segment between the first plane and the second plane; and
a second conductor platform that supports a portion of the second trace segment between the first plane and the second plane to maintain a spacing between the portions of the trace segments, the second conductor platform being spaced apart from the first conductor platform.

26. The disk drive of claim 25 wherein the first conductor platform is substantially parallel to the second conductor platform.

27. The disk drive of claim 25 wherein at least one of the conductor platforms is positioned to be non-parallel to the first plane.

28. The disk drive of claim 25 wherein each of the conductor platforms is positioned to be non-parallel to the first plane.

29. The disk drive of claim 25 wherein each of the conductor platforms is positioned to be non-parallel to the first plane and the second plane.

30. The disk drive of claim 25 further comprising a load beam and a baseplate that secures the load beam to the actuator arm, wherein the first conductor platform is at least partially positioned between the baseplate and the load beam.

31. The disk drive of claim 25 further comprising a load beam and a baseplate that secures the load beam to the actuator arm, wherein the first conductor platform is formed as a unitary structure with the actuator arm.

32. The disk drive of claim 25 further comprising a load beam and a baseplate that secures the load beam to the actuator arm, wherein the first conductor platform is formed as a unitary structure with the baseplate.

33. The disk drive of claim 25 wherein the first surface defines a first plane and the second surface defines a second plane, and wherein the first conductor platform extends away from the outer edge at an angle from the first plane toward the second plane, and the second conduct platform extends away from the outer edge at an angle from the second plane toward the first plane.

* * * * *